United States Patent [19]
Dodgen

[11] Patent Number: 5,100,196
[45] Date of Patent: Mar. 31, 1992

[54] COMBINATION SHOWER AND CLOSET DEVICE FOR RECREATIONAL VEHICLES AND THE LIKE

[76] Inventor: John N. Dodgen, 605 8th St. North, Humbolt, Iowa 50548

[21] Appl. No.: 487,924

[22] Filed: Mar. 5, 1990

[51] Int. Cl.⁵ .............................................. B60P 3/32
[52] U.S. Cl. .................................. 296/156; 296/164; 4/597; 4/599
[58] Field of Search ...................... 296/24.1, 156, 164; 4/597, 599

[56] References Cited

U.S. PATENT DOCUMENTS

| | | | |
|---|---|---|---|
| 2,466,378 | 4/1949 | Charteris | 4/597 |
| 4,685,719 | 8/1987 | Hanemayer | 296/156 |

FOREIGN PATENT DOCUMENTS

| | | | |
|---|---|---|---|
| 2643030 | 3/1978 | Fed. Rep. of Germany | 296/164 |
| 3200115 | 7/1983 | Fed. Rep. of Germany | 4/597 |
| 2623387 | 5/1989 | France | 4/599 |

*Primary Examiner*—Margaret A. Focarino
*Assistant Examiner*—Andrew C. Pike
*Attorney, Agent, or Firm*—Zarley, McKee, Thomte, Voorhees & Sease

[57] ABSTRACT

A shower stall has a surrounding wall structure, and a movable closet compartment is mounted in the shower stall. An access opening in provided in a first wall portion of the shower stall, with the closest compartment being mounted in a recessed position within an opening in a second wall portion of the shower stall. Suspension apparatus movably connects the closest compartment to the shower stall whereby the closest compartment can be moved to an extended position protruding outwardly from the shower stall so that the shower stall is substantially free from the presence of the movable closest.

2 Claims, 2 Drawing Sheets

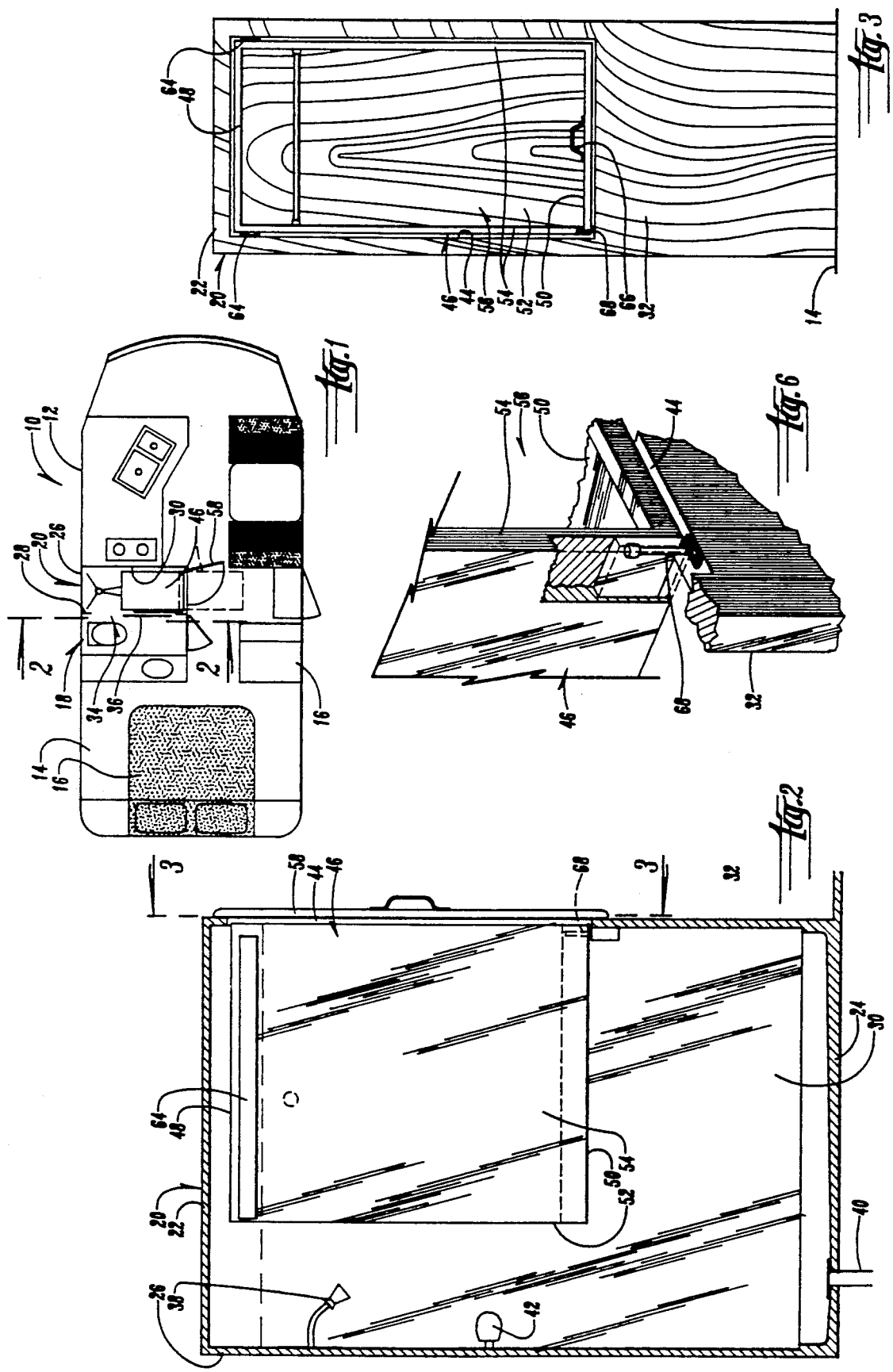

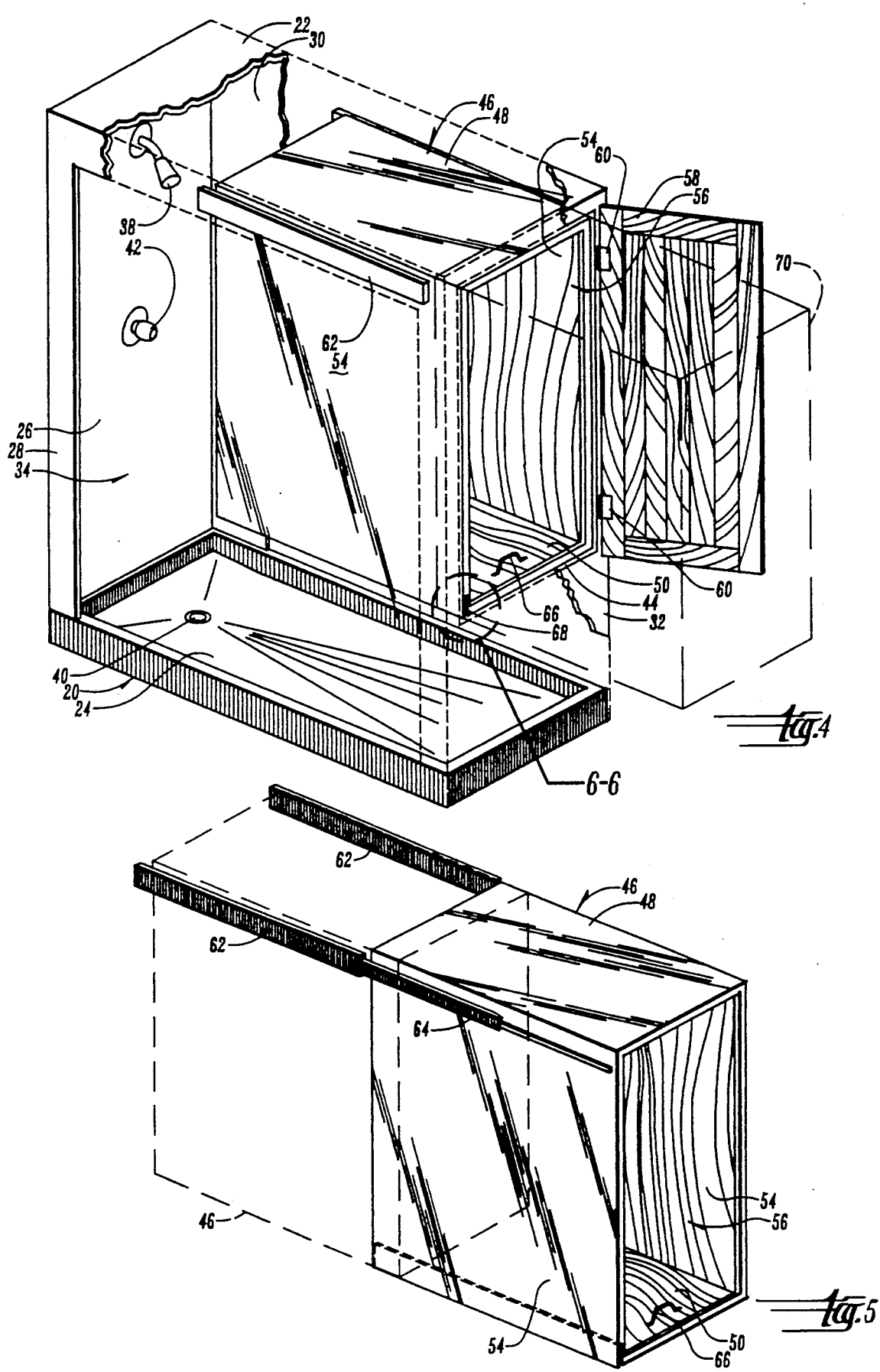

COMBINATION SHOWER AND CLOSET DEVICE FOR RECREATIONAL VEHICLES AND THE LIKE

BACKGROUND OF THE INVENTION

Floor space is at a minimum in most recreational vehicles and the like. Efficiency and compactness in furniture and fixtures within such a device are essential.

A further object of this invention is to provide a combination shower and closet device for recreational vehicles and the like wherein the closet device can be easily moved from a recessed position within the shower stall to an inoperative protruding position while the shower is in use.

A still further object of this invention is to provide a combination shower and closet device for recreational vehicles and the like which is economical to manufacture, durable in use, and refined in appearance.

These and other objects will be apparent to those skilled in the art.

BRIEF SUMMARY OF THE INVENTION

This invention entails a shower stall with a surrounding wall structure, and a movable closet compartment mounted in the shower stall. An access opening is provided in a first wall portion of the shower stall, with the closet compartment being mounted in a recessed position within an opening in a second wall portion of the shower stall.

Suspension means movably connects the closet compartment to the shower stall whereby the closet compartment can be moved to an extended position protruding outwardly from the shower stall so that the shower stall is substantially free from the presence of the movable closet.

It is therefore a principal object of this invention to provide a combination shower and closet device for recreational vehicles and the like wherein the shower stall has a movable closet compartment therein which can be selectively moved fromm an inner to an outer position so that both the shower stall and the closet can occupy the same space when the shower is not being used.

A further object of this invention is to provide a combination shower and closet device for recreational vehicles and the like wherein the closet device can be easily moved from a recessed position within the shower stall to an inoperative protruding position while the shower is in use.

A still further object of this invention is to provide a combination shower and closet device for recreational vehicles and the like which is economical to manufacture, durable in use and defined in appearance.

These and other objects will be apparent to those skilled in the art.

BRIEF DESCRIPTION OF THE DRAWINGS

FIG. 1 is a plan view of a typical recreational vehicle with the device of this invention mounted therein;

FIG. 2 is a elevational view of the shower stall with the closet compartment recessed therein shown at an enlarged scale on line 2—2 of FIG. 1;

FIG. 3 is an elevational view taken on line 3—3 of FIG. 2;

FIG. 4 is a partial perspective view of the shower stall with the closet compartment recessed therein;

FIG. 5 is a perspective view of the closet compartment alone mounted on its suspension system or supporting structure; and FIG. 6 is a partial sectional view at an enlarged scale taken on line 6—6 of FIG. 4.

DESCRIPTION OF THE PREFERRED EMBODIMENT

A recreational vehicle 10 has an outer perimeter wall 12 with a conventional floor 14. A plurality of fixtures and furniture 16 are located in conventional fashion on floor 14. The numeral 18 designates a conventional bath compartment.

A shower stall 20 of rectangular shape is located adjacent bath compartment 18 and is comprised of top wall 22 and bottom wall 24. A rear wall 26 is coextensive with the outer perimeter wall 12. Side wall 28 is adjacent bath compartment 18, and side wall 30 is opposite side wall 28. An inside wall 32 (FIG. 6) is located within the interior of the vehicle. An opening 34 exists in side wall 28 and can be closed by curtain or sliding door 36. Shower stall 20 has a conventional shower head 38, a conventional drain 40, and a conventional shower control 42. As shown in FIG. 6, inside wall 32 has an opening 44 therein which will be discussed hereafter. Each sidewall of show stall 20 is straight. Adjacent walls 26 and 28; 26 and 30; 30 and 32; are at right angles to each other to form the rectangular shape of the shower stall 20.

A closet compartment 46 is slidably mounted within opening 44 in the inside shower stall wall 32. The closet compartment is comprised of a top wall 48, a bottom wall 50, a rear wall 52, and side walls 54. An inside opening 56 is located in closet compartment 46 opposite to rear wall 52 and is substantially flush with wall 32 when compartment 46 is in its recessed position. A door 58 adapted to close opening 56 is secured to the closet compartment 46 by hinges 60.

Tracks 62 are secured in any convenient manner to the interior walls of shower stall 20 (FIG. 4). Tracks 64 are secured to the upper exterior side walls 54 of closet compartment 46, and are adapted to be slidably received within tracks 62. A handle 66 is secured to the bottom wall 50 of closet compartment 46 to facilitate the manual sliding of the closet compartment 46 on the tracks 62. Guide elements 68 (FIG. 6) mounted adjacent the side edges of opening 44 serve to stabilize the closet compartment during the sliding operation.

When the shower stall is not being used, the closet compartment 46 is in the recessed position shown best in FIGS. 2 and 4. When it is desired to use the shower stall, the door 58 of closet compartment is opened. The operator can grasp handle 66 and pull the closet compartment from it's recessed position to a protruding position shown by the dotted lines 70 in FIG. 4. See also the solid lines in FIG. 5 for the protruding position of the closet compartment 46.

The rear wall 52 effectively closes the opening 44 in wall 32 so that the shower stall is essentially and effectively closed when in use.

When the shower is no longer in use, the operator can then slide the closet compartment 46 from the protruding position shown in FIG. 5 back to the recessed position within the shower stall as shown in FIGS. 2 and 4.

This invention, by allowing a closet and shower stall to occupy the same essential volume when the shower is not in use, greatly enhances and increases the available space available in the confined interior of a recreational vehicle or the like. It is therefore seen that this invention will achieve at least its stated objectives.

I claim:

1. In combination, an enclosed living space having a shower stall formed by a surrounding rectangular wall structure consisting of a plurality of straight walls forming a rectangular shape, a movable rectangular closet compartment movably mounted in said shower stall, an access opening in a first straight wall portion of said shower stall, a second opening in a second straight wall portion of said shower stall, a sliding suspension means movably connecting said closet compartment to said shower stall whereby said closet compartment can be moved longitudinally in only a horizontal direction from a recessed position within said shower stall to an extended position outside said shower stall through said second opening so that said shower stall is substantially free from a presence of said movable closet, and a rear wall on said closet compartment to close said second opening when said closet compartment is moved to said extended position.

2. The combination of claim 1 wherein said closet compartment has top, bottom, side, and rear walls, and a forward opening, with said forward opening being substantially flush with said second wall portion of said shower stall when said closet compartment is in the recessed position.

* * * * *